United States Patent [19]

Nissen

[11] Patent Number: 5,393,162
[45] Date of Patent: Feb. 28, 1995

[54] PIVOTING JOINT ASSEMBLY

[76] Inventor: Carl-Erik M. Nissen, 2430 Cardena Crescent, Box 51, Port McNeill, B.C., Canada, V0N 2R0

[21] Appl. No.: 21,971

[22] Filed: Feb. 24, 1993

[51] Int. Cl.⁶ ............................ F16B 17/00; B66C 1/00
[52] U.S. Cl. ..................................... 403/154; 403/315; 403/150; 403/78; 403/79; 294/82.1
[58] Field of Search ....................... 403/58, 62, 63, 72, 403/73, 74, 78, 79, 157, 150, 158, 154, 315, 316, 317, 318; 294/82.1, 82.11; 254/413, 409, 390; 285/91; 411/522, 539

[56] References Cited

U.S. PATENT DOCUMENTS

| 1,903,863 | 4/1933 | Hayden . |
| 2,625,005 | 1/1953 | Myers .................................. 294/82.1 |
| 2,704,681 | 3/1955 | Fischer . |
| 3,466,073 | 9/1969 | Pohle . |
| 4,308,419 | 12/1981 | Fredriksson . |
| 4,561,797 | 12/1985 | Aldridge . |
| 4,669,907 | 6/1987 | Patton . |
| 4,936,612 | 6/1990 | Kohn . |
| 5,127,764 | 7/1992 | Baer .................................. 411/522 |

FOREIGN PATENT DOCUMENTS 134862 3/1985 European Pat. Off. ......... 294/82.11

Primary Examiner—Randolph A. Reese
Assistant Examiner—Anthony Knight
Attorney, Agent, or Firm—Christie, Parker & Hale

[57] ABSTRACT

A pivoting joint assembly that includes a first portion formed with a first aperture and a second portion formed with a second aperture, the first and second apertures being alignable. A recess is formed about the second aperture. There is a shaft insertable through the first and second apertures. A bearing surface is formed adjacent one end of the shaft and a retaining member is releasably mountable to the other end of the shaft. A spacing member is insertable between the first and second portions to separate the portions to an extent such that the bearing surface of the shaft engages and retains the first portion on the shaft and the retaining member mounted to the shaft is positioned within the recess of the second portion to define a second bearing surface that engages and retains the second portion on the shaft. The first and second portions are releasably and rotatably locked together for rotation with respect to each other about an axis defined by the shaft.

10 Claims, 2 Drawing Sheets

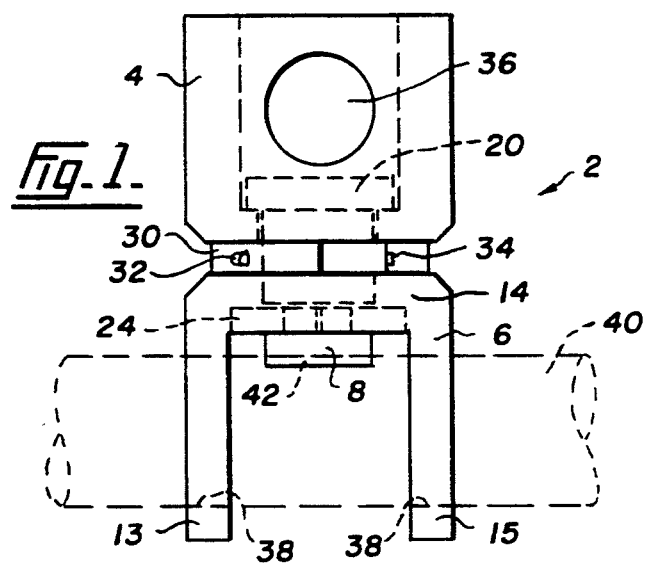
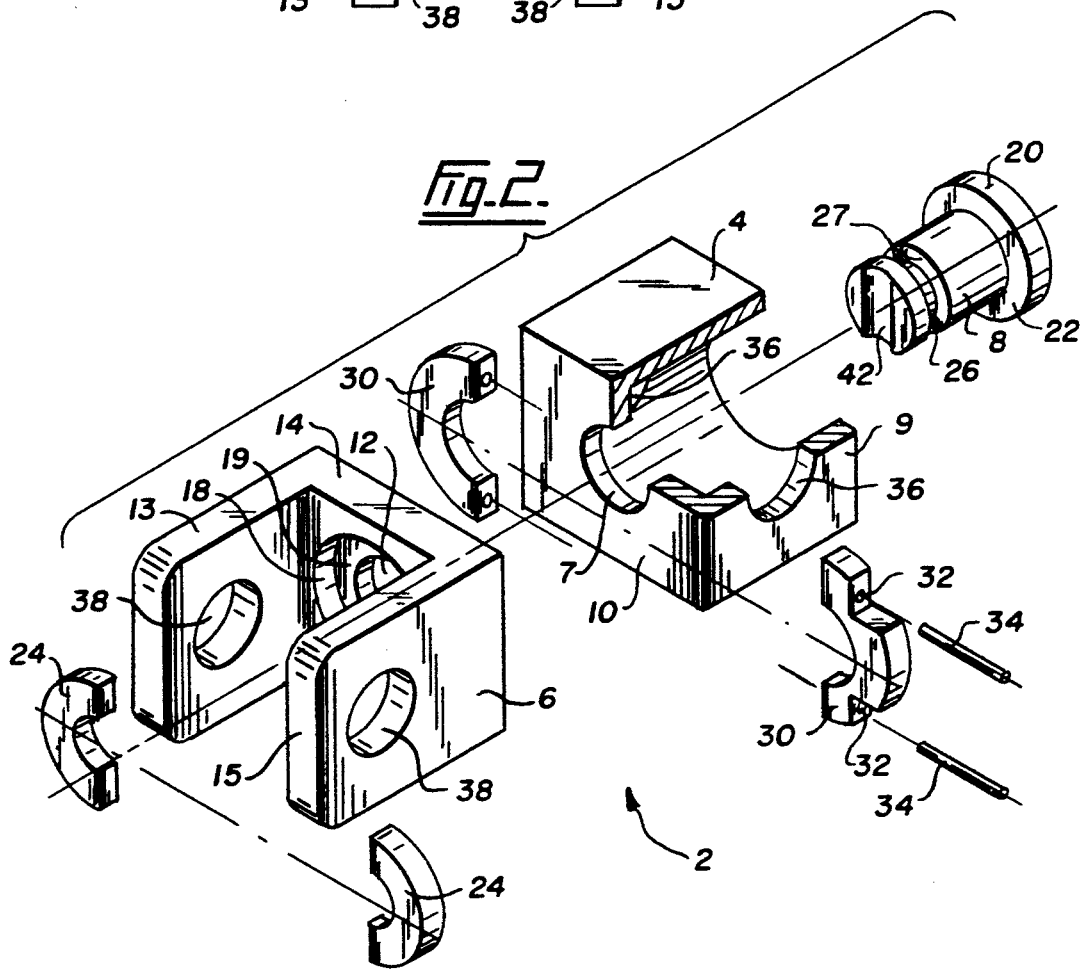

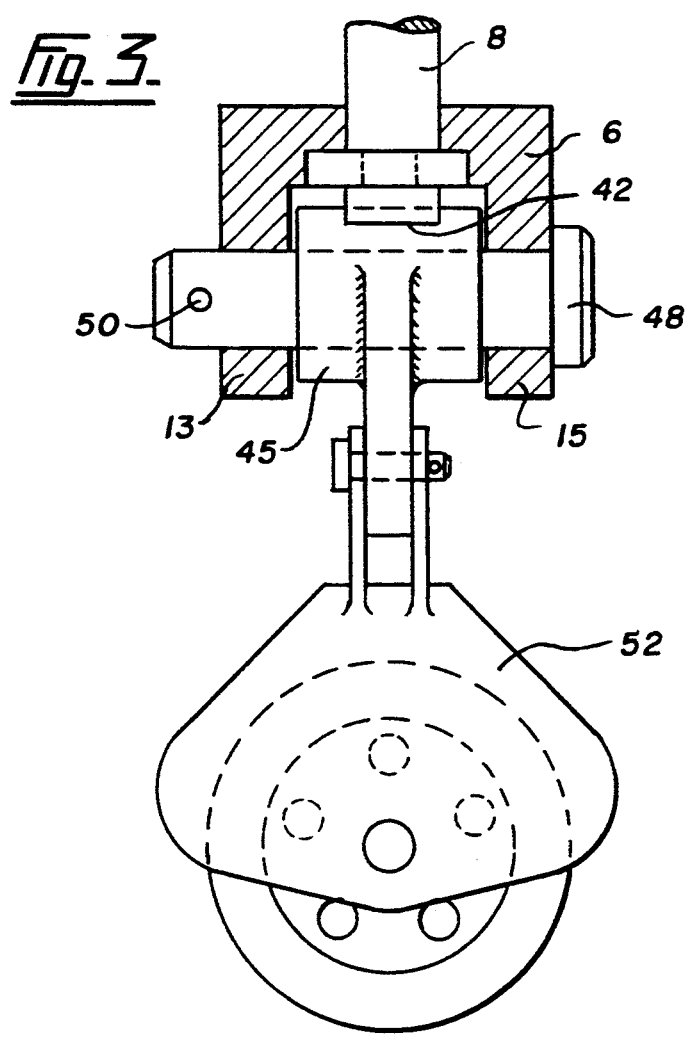

PIVOTING JOINT ASSEMBLY

FIELD OF THE INVENTION

This invention relates to a pivoting joint assembly suitable for pivotally connecting two components.

BACKGROUND OF THE INVENTION

Joint assemblies are well known in mechanical systems. Many joint assemblies are designed to permit pivotal movement of the connected components with respect to each other. Examples of prior art joint assemblies include:
U.S. Pat. No. 2,704,681 to Fischer
U.S. Pat. No. 4,561,797 to Aldridge
U.S. Pat. No. 4,669,907 to Patton
U.S. Pat. No. 4,308,419 to Fredriksson
U.S. Pat. No. 1,903,863 to Hayden Joint assemblies find particular application in lifting loads. Once lifted and supported, it is desirable to be able to manoeuvre the load by rotation or pivoting of the joint assembly. It is important to have a joint assembly that is reliable and sufficiently robust to safely handle very heavy loads. It is also preferable that the joint assembly be of relatively simple construction so that it can be easily broken down for maintenance and repair.

SUMMARY OF THE INVENTION

The present invention provides a pivoting joint assembly comprising:
a first portion formed with a first aperture;
a second portion formed with a second aperture, said first and second apertures being alignable;
a recess formed about the second aperture;
a shaft insertable through the first and second apertures;
bearing means formed adjacent one end of the shaft;
a retaining member releasably mountable to the other end of the shaft;
a spacing member insertable between the first and second portions to separate the portions to an extent such that the bearing means of the shaft engages and retains the first portion on the shaft and the retaining member mounted to the shaft is positioned within the recess of the second portion to define a second bearing means that engages and retains the second portion on the shaft to releasably and rotatably lock together the first and second portions for rotation with respect to each other about an axis defined by the shaft.

The present invention provides a simple, compact and robust joint assembly that can be easily assembled and dismantled for maintenance and repair.

BRIEF DESCRIPTION OF THE DRAWINGS

Aspects of the present invention are illustrated, merely by way of example, in the accompanying drawings, in which:
FIG. 1 is an assembled view of a preferred embodiment of the joint assembly; and
FIG. 2 is an exploded view of the joint showing the various parts.
FIG. 3 shows the lower portion of the joint assembly configured to support a load.

DESCRIPTION OF THE PREFERRED EMBODIMENTS

Referring to FIGS. 1 and 2, there is shown a pivoting joint assembly 2 according to a preferred embodiment of the present invention.

FIG. 2 shows an exploded view of the joint assembly that includes a first portion 4 and a second portion 6 that are connectable by a shaft 8.

First portion 4 is formed with a first aperture 7. Preferably, portion 4 comprises an essentially rectangular housing having an open top, side walls 9 and a base 10 in which aperture 7 is formed.

Second portion 6 is formed with a second aperture 12 that is alignable with aperture 7. Preferably, second portion 6 comprises a U-shaped bracket having arms 13 and 15 that are connected by base 14 in which aperture 12 is formed. Recess 18 is formed in base 14 about the second aperture 12 to define a shoulder 19 in the base.

Shaft 8 is insertable through the first and second apertures to connect portions 4 and 6 together for rotation about an axis defined by the shaft. Shaft 8 is formed with bearing means adjacent one end of the shaft comprising an enlarged end 20 of the shaft defining a shoulder 22 that acts as a bearing surface to engage against the base 10 of first portion 4.

The other end of shaft 8 is formed with a mounting location to receive a retaining member that comprises an annular split washer 24 formed from two parts. The mounting location comprises a circumferential groove 26 that is formed about the shaft and dimensioned to accept the two parts of the split washer. Groove 26 has opposed side walls 27 that prevent axial movement of the split washer along the shaft when in place in the groove.

A spacing member in the form of an annular split ring 30 is insertable between the first and second portions about the shaft. Split ring 30 when inserted between the first and second portions acts to separate the portions while providing a bearing surface to permit rotation of the first and second portions with respect to each other about shaft 8. Split ring 30 is formed from two parts that include locking means to hold the two parts together when in position about the shaft between the first and second portions. Preferably, the locking means comprise a pair of channels 32 formed in each of the two parts of the split ring to accept split pins 34. Split pins 34 are inserted into the channels when in place about shaft 8 to extend through the parts to releasably lock the parts together.

When split ring 30 is in place between the first and second portions 4 and 6, respectively, about shaft 8, the portions are separated to an extent such that the enlarged end 20 of shaft 8 engages and retains the first portion 4 on the shaft and split washer 24 mounted about the shaft in groove 26 is drawn into recess 19 in base 14 of second portion to define a second bearing surface that engages and retains the second portion on the shaft. The two parts of split washer 24 are dimensioned to be housed and rotatable within recess 19 of the second portion. The recess acts to prevent radial movement of the two parts away from the shaft to allow split washer 24 to retain second portion 6 on the shaft. The assembled state of the joint assembly is shown in FIG. 1.

In this manner, first portion 4 and second portion 6 are releasably and rotatably locked onto shaft 8 for rotation with respect to each other about the shaft.

It is apparent from the foregoing description that the assembly and breakdown of the joint of the present invention is very simple. It is necessary to remove split ring 30 from between the portions to permit movement of second portion 6 toward first portion 4 so that split ring 24 is extended from recess 19. Split ring 24 can then be removed from groove 26 which permits shaft 8 to be withdrawn through aperture 12 in the second portion and aperture 7 in the first portion.

The various bearing surfaces of the joint assembly can be provided with bearings and lubrication to permit smooth and relatively friction free motion.

The joint assembly of the present invention includes connecting means for attachment of the assembly into a useful working position. For example, as best shown in FIG. 1, first portion 4 is formed with a pair of aligned apertures 36 in side walls 9 to receive a pin associated with a support member in order to pivotally connect the first portion to the support member. In a similar manner, second portion 6 includes a pair of aligned apertures 38 in arms 13 and 15 to accept a pin 40, shown in dashed lines, for supporting means for lifting a load such as a pulley, hook or like member.

In an alternative configuration, illustrated in FIG. 3, the connecting means comprises a sleeve 45 insertable between arms 13 and 15 of second portion 6 for alignment with apertures 38. Pin 48 is insertable through apertures 38 and sleeve 45 and locked in place using a conventional locking pin 50 inserted through the end of pin 48 to pivotally attach the sleeve to the second portion. Sleeve 45 has an attached lifting device such as pulley assembly 52.

The end of shaft 8 is provided with means for limiting rotation of the shaft with respect to a particular portion comprising groove 42 formed across the end of the shaft. Groove 42 is positioned and dimensioned to engage directly against pin 40 (FIG. 1) or sleeve 45 (FIG. 3) to prevent rotation of shaft 8 with respect to second portion 6. Therefore, all shaft rotation is transferred to first portion 4 to be accommodated by the thrust bearing arrangement created by the enlarged end 20 of shaft 8 engaging against floor 10 of first portion 4.

Although the present invention has been described in some detail by way of example for purposes of clarity and understanding, it will be apparent that certain changes and modifications may be practised within the scope of the appended claims.

I claim:

1. A pivoting joint assembly comprising:
   a first portion formed with a first aperture;
   a second portion formed with a second aperture, said first and second apertures being alignable;
   a recess formed about the second aperture;
   a shaft insertable through the first and second apertures;
   bearing means formed formed adjacent one end of the shaft;
   a retaining member releasably mountable to the other end of the shaft to prevent axial movement of the retaining member alone the shaft;
   a spacing member comprising an annular split ring having two parts insertable between the first and second portions about the shaft, and locking means to hold the two parts together when in position about the shaft, the spacing member acting to separate the portions to an extent such that the bearing means of the shaft engages and retains the first portion on the shaft and the retaining member mounted to the shaft is positioned within the recess of the second portion to define a second bearing means that engages and retains the second portion on the shaft to releasably and rotatably lock together the first and second portions for rotation with respect to each other about an axis defined by the shaft.

2. Apparatus as claimed in claim 1 in which the bearing means of the shaft comprises an enlarged end of the shaft defining a shoulder that acts as a bearing surface.

3. Apparatus as claimed in claim 1 in which the retaining member comprises an annular split washer formed from two parts positionable at a mounting location on the shaft.

4. Apparatus as claimed in claim 3 in which the mounting location comprises a circumferential groove formed about the shaft dimensioned to accept the two parts of the split washer, the groove having edges that prevent movement of the split washer axially along the shaft.

5. Apparatus as claimed in claim 3 in which the two parts of the split washer are dimensioned to be housed within the recess of the second portion when mounted about the shaft, the recess acting to prevent radial movement of the two parts away from the shaft.

6. Apparatus as claimed in claim 1 including connecting means to permit attachment of the portions between a support member and a load to be lifted.

7. Apparatus as claimed in claim 6 including means for limiting rotation of the shaft with respect to a particular portion.

8. Apparatus as claimed in claim 7 in which the means for limiting rotation comprises a groove formed in the end of the shaft to engage with the connecting means of one portion such that rotation of the shaft with respect to the one portion is prevented and all shaft rotation is thereby transferred to the other portion.

9. Apparatus as claimed in claim 6 in which the connecting means comprises a pair of aligned apertures formed in each portion and a pin for insertion through the apertures of each portion to permit attachment of one portion to a support member and the other portion to means for lifting a load.

10. Apparatus as claimed in claim 1 in which the locking means comprises a pair of channels formed in each of the two parts of the split ring, the channels of one part being alignable with the channels of the other part when the parts are placed together about the shaft and a pair of split pins for insertion into the channels to extend through the parts to releasably lock the parts together.

* * * * *